United States Patent
Wu et al.

(10) Patent No.: US 10,949,834 B1
(45) Date of Patent: Mar. 16, 2021

(54) SYSTEMS AND METHODS FOR GHOST CARD CREATION VIA A BROWSER EXTENSION

(71) Applicant: UIPCO, LLC, San Antonio, TX (US)

(72) Inventors: Huihui Wu, Grapevine, TX (US); Alejandra Valles, El Paso, TX (US); Darrius M. Jones, San Antonio, TX (US); Valmore M. Smith, San Antonio, TX (US); Lonnie B. Roberts, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 368 days.

(21) Appl. No.: 15/909,721

(22) Filed: Mar. 1, 2018

(51) Int. Cl.
*G06Q 20/34* (2012.01)

(52) U.S. Cl.
CPC ......... *G06Q 20/351* (2013.01); *G06Q 20/348* (2013.01); *G06Q 20/354* (2013.01)

(58) Field of Classification Search
None
See application file for complete search history.

(56) References Cited

U.S. PATENT DOCUMENTS

| 9,251,538 B1* | 2/2016 | Shakkarwar | G07F 17/32 |
| 2015/0149432 A1* | 5/2015 | Hart | G06Q 40/00 707/708 |
| 2016/0307089 A1 | 10/2016 | Wurmfeld et al. | |

OTHER PUBLICATIONS

U.S. Appl. No. 15/967,372, filed Apr. 30, 2018, Systems and Methods for Ghost Card Creation via a Browser Extension.

\* cited by examiner

*Primary Examiner* — Joseph W. King
(74) *Attorney, Agent, or Firm* — Perkins Coie LLP

(57) ABSTRACT

Embodiments described herein disclose methods and systems for identifying that a user is accessing a retailer or service provider website and automatically enabling an interactive window that includes personalized user information. The system can detect that the user is accessing a payment webpage associated with the website, and, in response, generate a selectable list of payment instruments associated with the user. When the user selects a payment instrument, the system can create an electronic ghost card linked to the payment instrument and the electronic ghost card information can be input into the payment webpage.

15 Claims, 14 Drawing Sheets

SYSTEMS AND METHODS FOR GHOST CARD CREATION VIA A BROWSER EXTENSION

BACKGROUND

Multiple issues can arise with online purchases. First, security breaches by retailers and service providers have become a near-everyday event. Data compromised in such breaches can include payment card data, email addresses, and other personal information, requiring customers and payment card issuers to take steps to remedy the situation. For example, if payment card information is compromised, the payment card issuer will cancel the payment card and send a new payment card to the customer. Second, when making an online purchase, many customers select a payment card without knowing the balance of the payment card or how the purchase may affect their budget instead of logging onto the payment card issuer's website to verify balances.

The present technology overcomes these and other limitations of current systems and provides other benefits that will become clearer to those skilled in the art from the following description.

BRIEF DESCRIPTION OF THE DRAWINGS

FIGS. 6-14 are examples of user interfaces used in some implementations of the technology.

Figure 1:
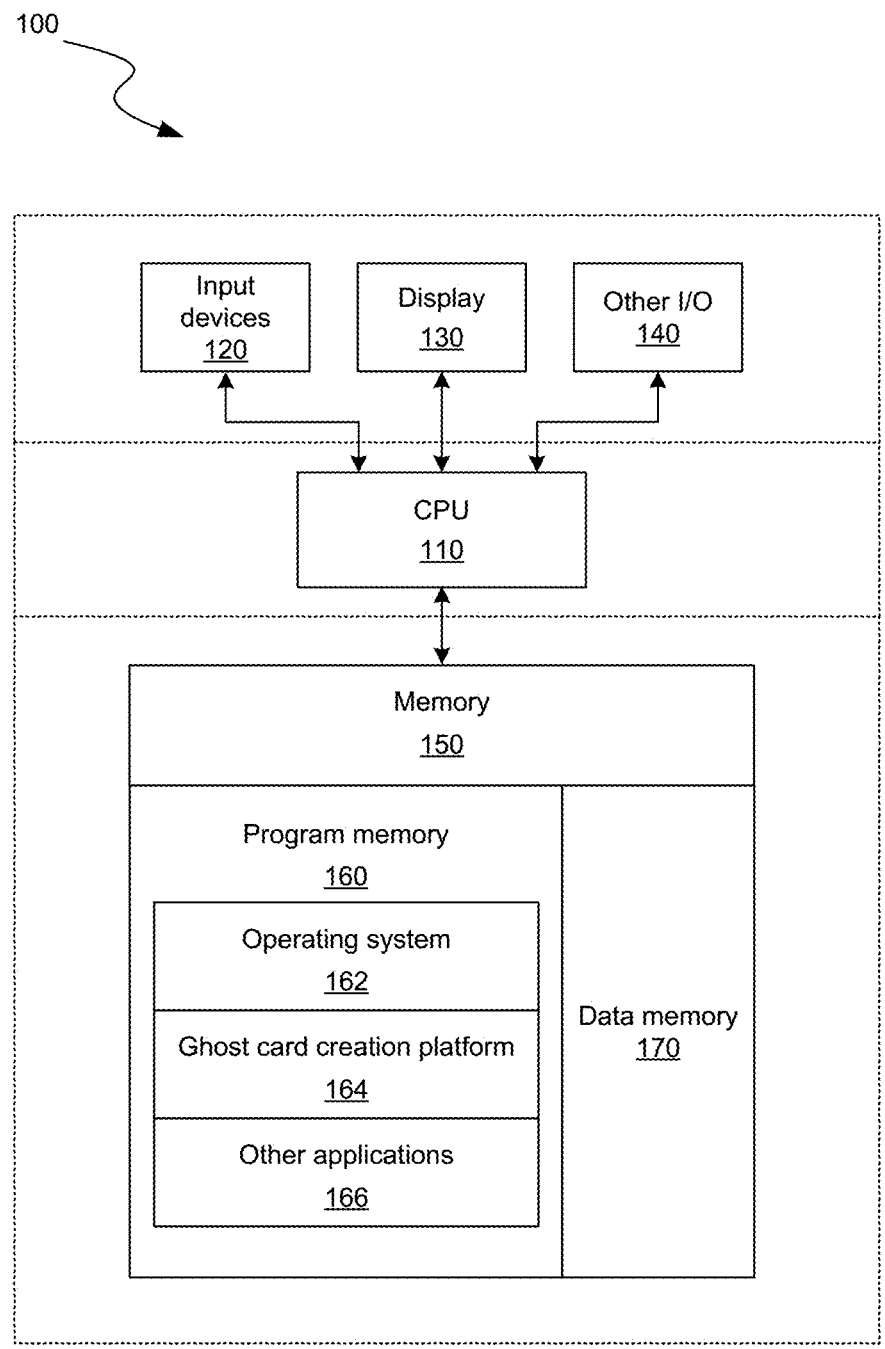
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Embodiments described herein provide systems and methods for creation of a ghost (i.e., secure) card via a browser extension. Online shopping can pose challenges that are addressed by the present technology. First, payment card data in the hands of retailers or service providers can easily be compromised. Second, payment card information, budget information, and other financial information is often not readily available to the user when the user is shopping online. Instead, if the user needs to access such information, the user must open a separate tab or window, provide access credentials, and locate the relevant information. Most users will skip these steps in hopes that they are making purchases within their means, selecting the payment instrument that provides the most benefits, and staying on track with their budget, but without knowing. Methods and systems disclosed herein address both of these issues with a single solution.

In some embodiments, a user can download a browser extension that identifies when a user is accessing a website of a retailer or service provider. In some embodiments, the user is required to provide authentication credentials to the browser and/or the browser extension before the browser extension provides user-specific information. The browser extension can identify the retailer or service provider website in various ways such as a predefined list, a category of website (e.g., top level domain), or historical transaction information, or in some cases, the user can enable (e.g., right click and select an option) the browser extension for a website. Once the browser extension is enabled, the system can cause an interactive window or icon to be displayed on the user's device. The interactive window can include personalized information such as a listing of payment cards or account balances, budget information, alerts to other deals, or other information. For example, the user can ask "How much have I spent on clothing this month?", and the system can provide a response via the interactive window. In some embodiments, the browser extension can detect that the user has certain items in the shopping cart of the retailer or service provider and then tailor the information to the user. For example, the interactive window can state, "If you purchase the $100 jacket in your shopping cart, you will be $5.00 over your clothing budget this month," or the interactive window can recommend that a particular payment instrument be used.

In some embodiments, the browser extension can detect that the user is accessing a payment webpage associated with the retailer or service provider website, and in response, can generate a selectable list of payment instruments. In some embodiments, only the eligible payment instruments (i.e., payment instruments that are not expired and have a sufficient limit or funds remaining) can appear in the window. In other embodiments, all payment instruments can appear with the ineligible payment instruments greyed out or not available for selection. In some embodiments, the list can appear in the interactive window or near the payment information when the user clicks in a field to provide the payment information. In other embodiments, the browser extension can cause a payment icon to appear (e.g., near the payment information on the payment webpage) and can generate and display the list when the user selects the payment icon. In some embodiments, the browser extension can automatically insert payment instrument information based on factors such as user preferences, historical transactions at the retailer or service provider, or category of purchase.

In some embodiments, the browser extension can receive a selection of a payment instrument and can, upon request or automatically, create an electronic ghost card that is linked to a selected payment instrument. The browser extension can enter the information associated with the electronic ghost card into the payment section of the payment webpage. The electronic ghost card can be a secure card in that it has no intrinsic value in itself and it is temporary.

To create the electronic ghost card, the system can generate a set of numbers including a payment card number, expiration date, and CVV or other verification code and link these numbers to the selected payment instrument. When the retailer or service provider sends an authorization request for a transaction with these numbers, the system can determine which payment card was linked and prior to authorizing the transaction, determine whether the transaction is authorized based on the linked payment instrument. In some embodiments, authorization for the transaction is made when the system creates the ghost card based on the amount of the transaction and the selected payment card. In this way, if the retailer or service provider had a data breach, the user's payment card information would not be compromised.

In some embodiments, the electronic ghost card is a one-time use payment card whereas in other embodiments, the electronic ghost card can be used multiple times. In some embodiments, the user can specify parameters for the electronic ghost card by, for example, using dynamically generated questions. The parameters can include eligible retailers, credit limit, and an expiration date, though the credit limit and the date are bounded by the credit limit and the expiration date of the selected payment instrument.

This disclosure describes systems and processes designed to provide on-demand financial information and to protect the user's payment card information by generating and using a secure card. Various embodiments may provide one or more of the following technological improvements: (1) increased security of payment card data, (2) immediate access to an electronic ghost card, (3) on-demand account balance information, and (4) real-time budget projections based on shopping cart data or user input data.

In the following description and for purposes of explanation, numerous specific details (e.g., screen shots) are set forth in order to provide a thorough understanding of embodiments of the present technology. It will be apparent, however, that embodiments of the present technology may be practiced without some of these specific details.

Suitable System

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that manage contact information. In some embodiments, the contact information is included in documents such as contracts. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memories, hard drives, floppy disks, CDs, DVDs, magnetic storage devices, tape drives, device buffers, and so forth. A memory is not a propagating signal divorced from underlying hardware; thus, a memory is non-transitory. Memory 150 can include program memory 160 that stores programs and software, such as an operating system 162, ghost card creation platform 164, and other application programs 166. Memory 150 can also include data memory 170 that can include payment instrument information (credit, debit or gift card numbers, expiration dates, verification numbers), account balances, budget information, paydays, income sources, authentication information, transaction information, and preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
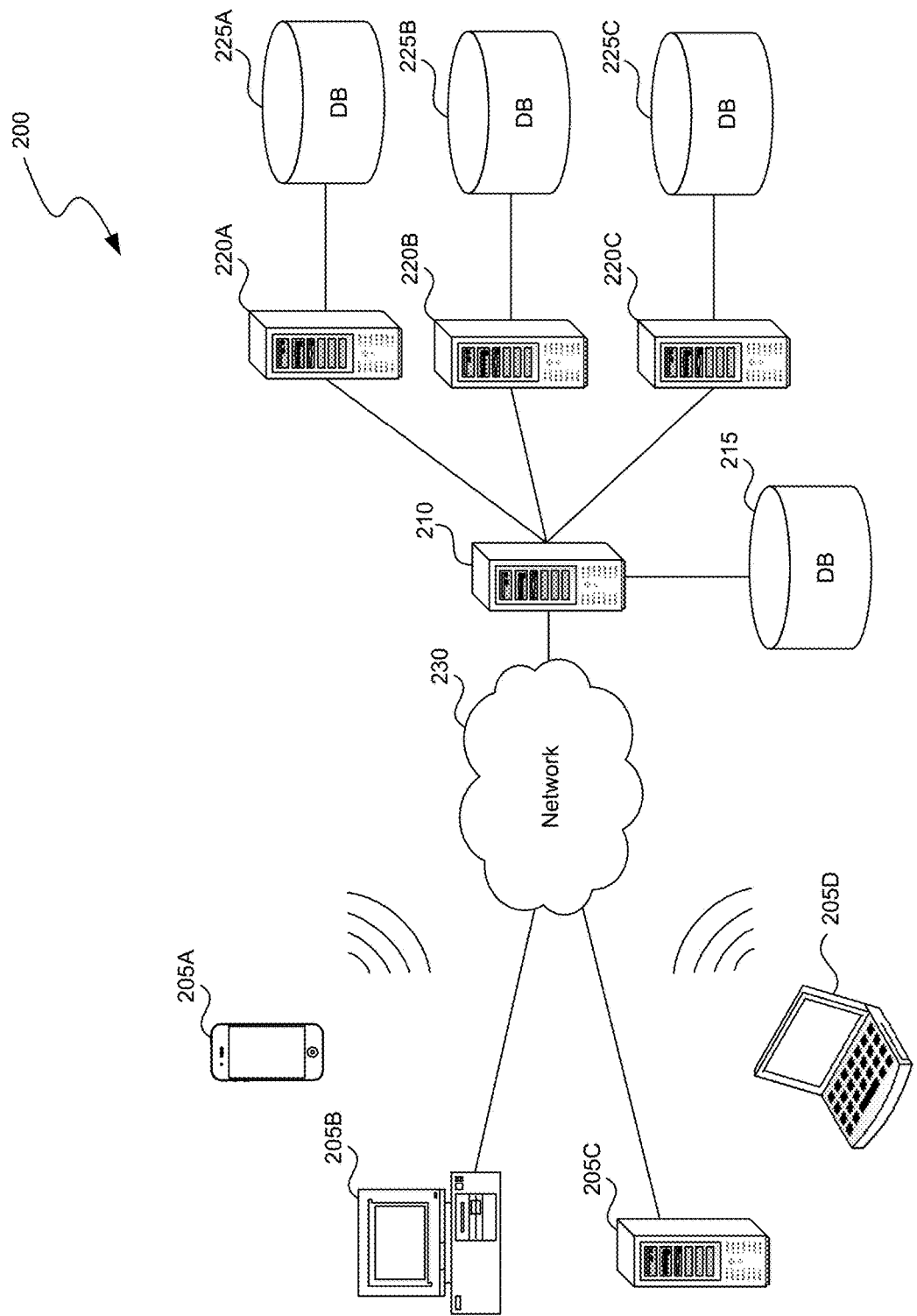
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as payment instrument information (credit, debit, or gift card numbers, expiration dates, verification numbers), account balances, budget information, paydays, income sources, authentication information, transaction information, and preferences. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but it can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
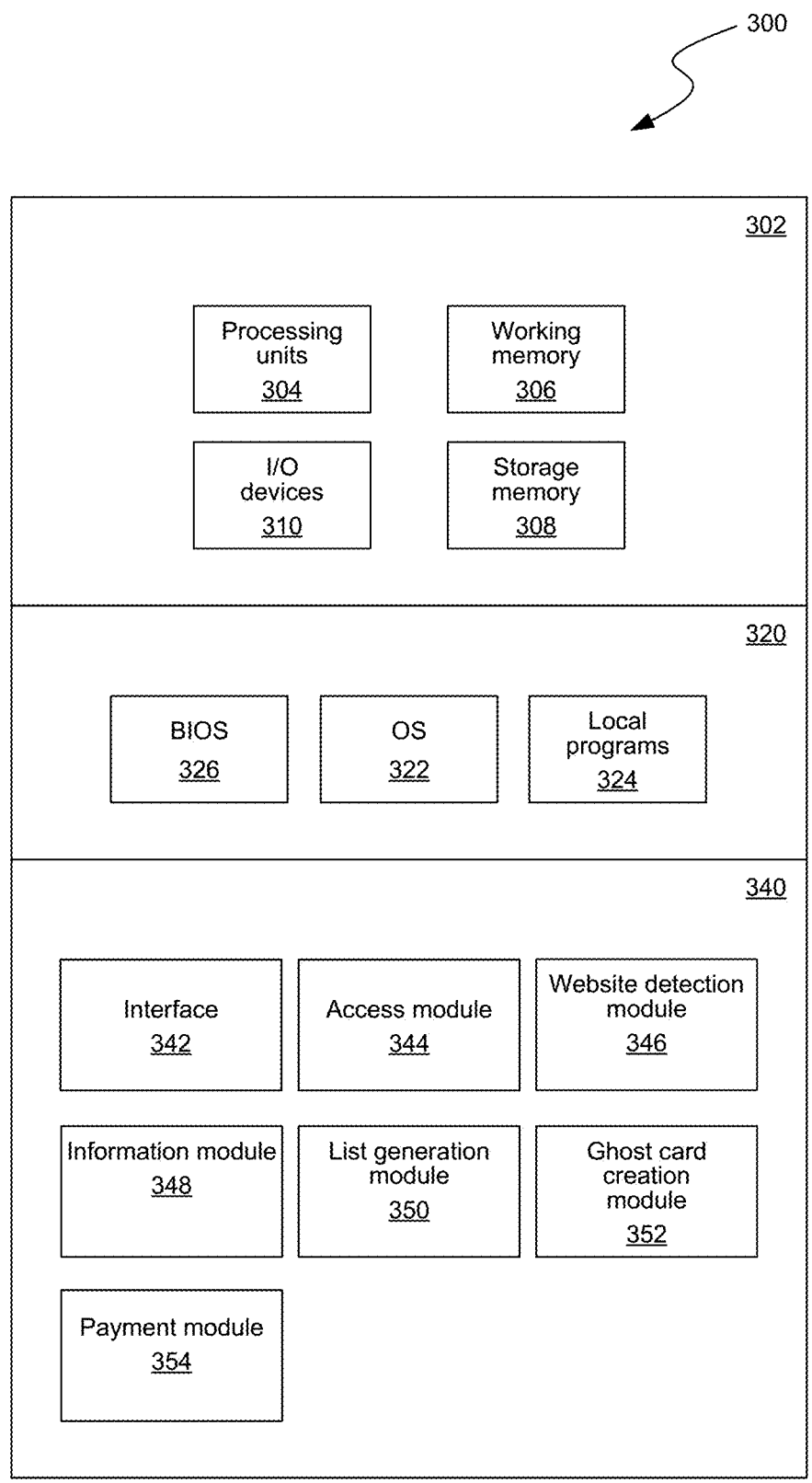
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications, including an operating system 322, local programs 324, and a basic input output system (BIOS) 326. Specialized components 340 can be subcomponents of a general software application 320, such as local programs 324. Specialized components 340 can include access module 344, website detection module 346, information module 348, list generation module 350, ghost card creation module 352, and payment module 354, and components that can be used for transferring data and controlling the specialized components, such as interface 342. In some implementations, components 300 can be in a computing system that is distributed across multiple computing devices or can be an interface to a server-based application executing one or more of specialized components 340.

Access module 344 can allow the user to use the browser extension by making the browser extension available for download and collecting authentication data to ensure the user has the proper credentials to use the browser extension to see the personalized information and to create ghost cards. In an example, the user can download the browser extension and provide credentials (e.g., username, password, biometrics). In some embodiments, the user is also or alternatively logged into a particular browser (e.g., Google Chrome). In some embodiments, the user is required to provide credentials each time a new browser is activated if the user would like to enable the browser extension.

Website detection module 346 can detect the website the user is accessing. When the website is one of a list of identified websites, is of a particular category (e.g., retail websites, websites with a certain extension, websites in which the user previously used the browser extension), website detection module can display an icon or window such as element 602 in FIG. 6. In some embodiments, the user can select element 602 in FIG. 6 and website detection module 346 can display icons or windows such as element 702 in FIG. 7, element 802 in FIG. 8, element 902 in FIG. 9, element 1002 in FIG. 10, and element 1102. If a website is not one of the identified websites, a user can manually bring up the icon or window (e.g., by right clicking and making a selection from a menu).

Information module 348 can provide user-specific information to the user. For example, information module 348 can access the user's accounts and provide account balances (e.g., credit card account balances, savings or checking account balances) and budget information, and can answer questions such as "How much money have I spent on clothing this month?," and "What will my credit card balance be if I make this purchase?," or "When is my next pay day?." In some embodiments, information module 348 can detect an item or an amount due based on a shopping cart or payment page on the retailer's website and provide questions or answers based on the items in the shopping cart or amount due on a payment webpage.

List generation module 350 can generate a list of payment instruments available to the user, including balances, and cause the list to be displayed on the user's device. List generation module 350 can display the payment instruments after detecting that the user is on a payment webpage of the retailer or service provider website or when the user begins to type in a payment information field. In some embodiments, list generation module 350 can place an icon next to the payment information field and when the user selects the icon, a selectable list of payment instruments can be displayed. In some embodiments, when the user has already made a purchase from a website, the same payment instrument can be automatically input into the payment information fields or the payment instruments can be arranged such that the most recently used payment instrument is placed at the most accessible place on the list (e.g., top or bottom, nearest the icon). In some embodiments, list generation module 350 recommends a payment instrument and asks the user which payment card the user would like to use via the interactive window.

Ghost card creation module 352 can create an electronic ghost card upon receiving a selection of a payment instrument with which to link the ghost card. The electronic ghost card can be a temporary payment mechanism linked to a user's payment card to anonymize the user's actual payment card information. The ghost card can include randomly generated numbers to insert into a payment webpage of a retailer or service provider website, including a credit or debit card number, CVV (or similar verification number), and expiration date. Ghost card creation module creates the electronic ghost card and associates the electronic ghost card with the selected payment instrument of the user. By doing so, when the issuing organization of the electronic ghost card receives an authorization request from the retailer or service provider, the issuing organization can determine the user's selected payment instrument that is linked to electronic ghost card, authorize the transaction (assuming the purchase falls within the boundaries of the selected payment instrument such as an expiration date and available funds or credit), and charge the selected payment instrument. In this way, the retailer is paid without ever seeing the user's actual payment instrument information. Should there by a security breach at the retailer or service provider, the user would not need to be issued another credit card.

Ghost card creation module 352 can create the electronic ghost card using various processes. For example, ghost card creation module 352 can create the electronic ghost card when the user clicks in one of the payment information fields so long as ghost card creation module 352 has an indication of which payment instrument to link the electronic ghost card to. In other embodiments, the system can provide an icon or window (e.g., next to or near) the payment instrument input information on the retailer or service provider website that the user can select. When selected, the system can list the user's payment instrument and the user can choose a payment instrument with which to link the ghost card. When the user indicates the payment instrument, ghost card creation module 352 can create the electronic ghost card. In some embodiments, the ghost card creation module 352 selects the payment instrument that provides the most benefit to the user (e.g., lowest interest rate, lowest balance, most preferential or highest rewards) and automatically creates an electronic ghost card linked to the selected payment instrument.

In some embodiments, the electronic ghost card is a one-time use payment mechanism, and a new ghost card must be created each time the user wishes to use a ghost card to pay at the retailer or service provider website. In other embodiments, the user can use the electronic ghost card again at the same retailer or service provider website (e.g., the electronic ghost card can be included in a list of available payment instruments or the electronic ghost card is automatically input at the retailer's website). In some embodiments, the user can indicate their preferences for the electronic ghost card. For example, the user can indicate an expiration date of the electronic ghost card, a limit on the amount of funds the electronic ghost card can be used to make a purchase, and the retailers at which the electronic ghost card can be used. The expiration date and the limit of funds can be bounded by (i.e., cannot exceed) the expiration date and the limit of funds of the payment instrument linked to the electronic ghost card. In some embodiments, the user cannot view the electronic ghost card information and the system input information should the user want to use the electronic ghost card again. In other embodiments, the user is given the ghost card information and can use the ghost card within the restrictions selected by the user or the issuing organization.

Payment module 354 can automatically fill in payment information in a payment section of the payment webpage based on the selected payment instrument (e.g., electronic ghost card or other payment instrument). If a payment instrument was previously selected as preferred for the retailer or service provider website, then payment module 354 can automatically input the preferred payment instrument.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
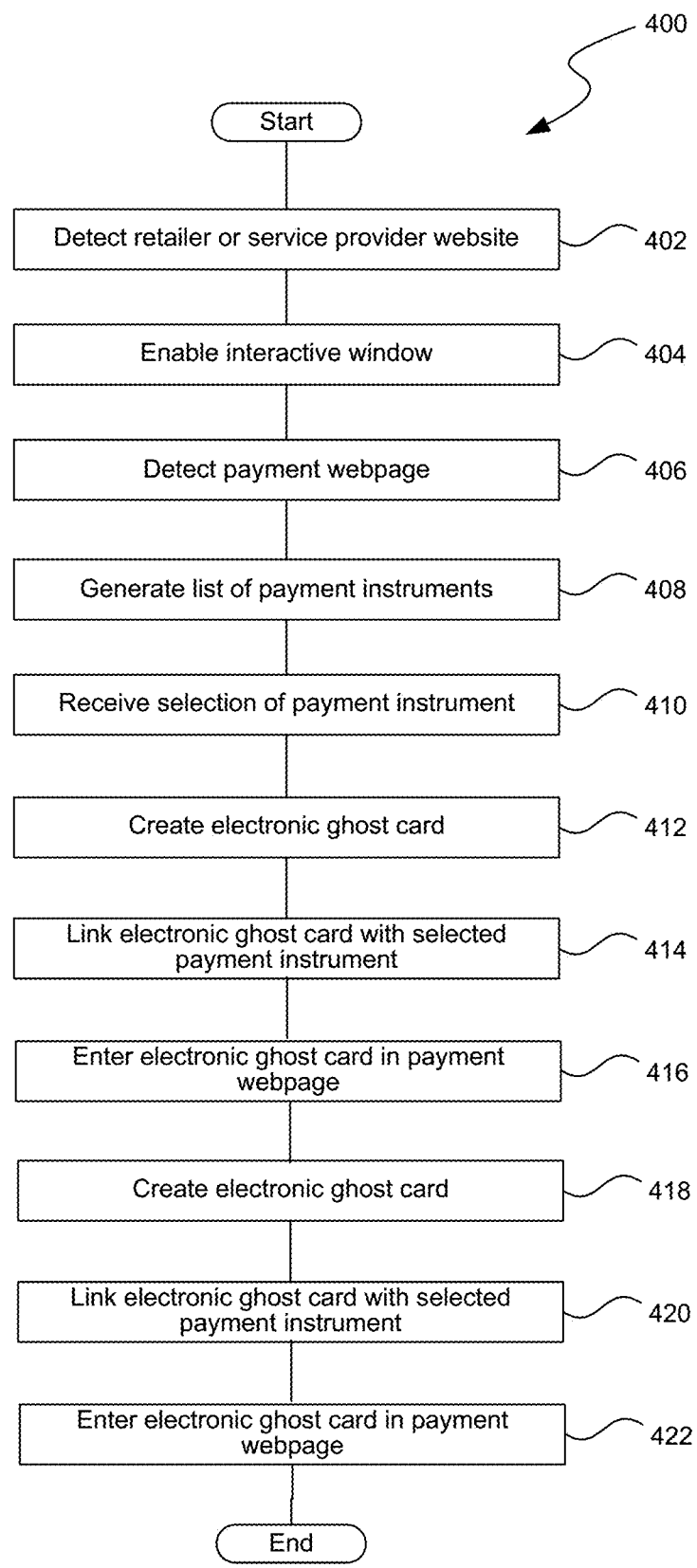
FIG. 4 is a flow diagram illustrating a process used in some implementations for creating a ghost card via a browser extension.

FIG. 4 is a flow diagram illustrating a set of operations 400 for creating a ghost card via a browser extension. Detecting operation 402 detects that the user is accessing a retailer or service provider website. Enabling operation 404 enables an interactive window or icon that can provide information as requested. Detecting operation 406 detects that the user is accessing a payment webpage of the retailer or service provider. Generating operation 408 generates a list of payment instruments associated with the user. The list can be displayed in the interactive window or via a separate window or icon. Receiving operation 410 receives a selection of a payment instrument. Creating operation 412 creates an electronic ghost card and linking operation 414 links the electronic ghost card with the selected payment instrument. In some embodiments, the user can provide restrictions on the electronic ghost card such as a credit or amount limit, expiration date, and/or number of allowed uses. Entering operation 416 enters the electronic ghost card into the payment webpage. Receiving operation 418 receives a request for authorization of the transaction using the electronic ghost card. Reviewing operation 420 reviews whether the payment instrument linked to the electronic ghost card has sufficient credit or funds to support the transaction. Authorizing operation 420 authorizes the transaction when the payment instrument has sufficient funds or credit. Charging operation 422 charges the payment instrument for the transaction.

Figure 5:
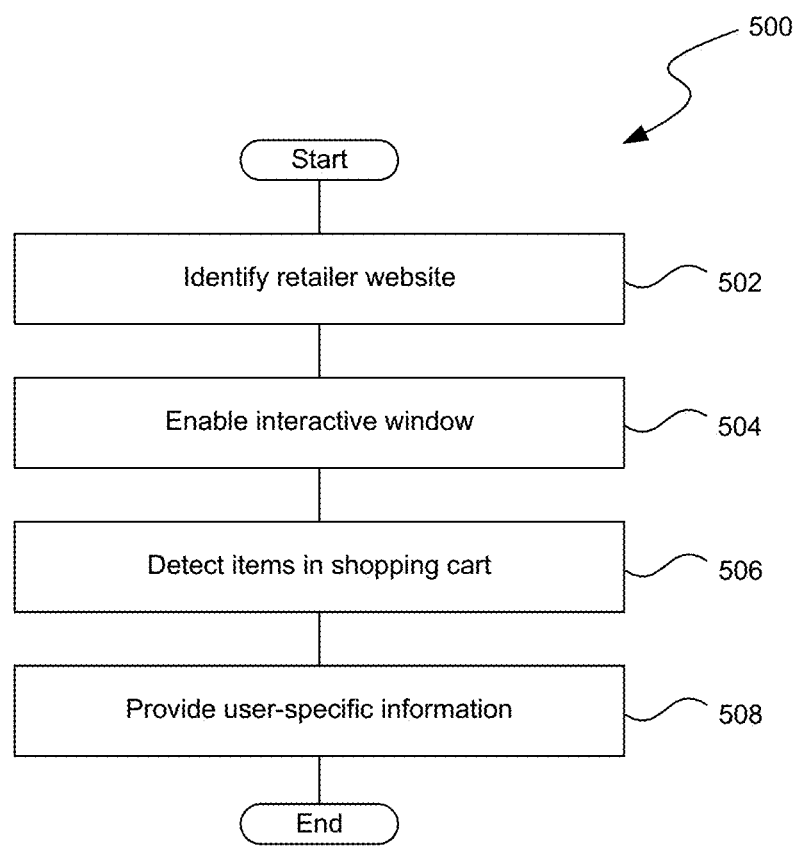
FIG. 5 is a flow diagram illustrating a process used in some implementations for generating personalized information via the browser extension.

FIG. 5 is a flow diagram illustrating a set of operations 500 for generating personalized information via the browser extension. Identifying operation 502 identifies that the user is accessing a retailer or service provider website. Enabling operation 504 enables an interactive window used to communicate with the user. The system can send personalized information to the user via the interactive window, and the user can ask questions or otherwise request information via the interactive window (e.g., budget information, payment card, or account balances). Detecting operation 506 detects items in the user's shopping cart of the retailer or service provider website. Providing operation 508 can communicate about the items via the interactive window (e.g., "If you purchase these items, you will have $50 remaining in your clothing budget for this month.").

Figure 6:
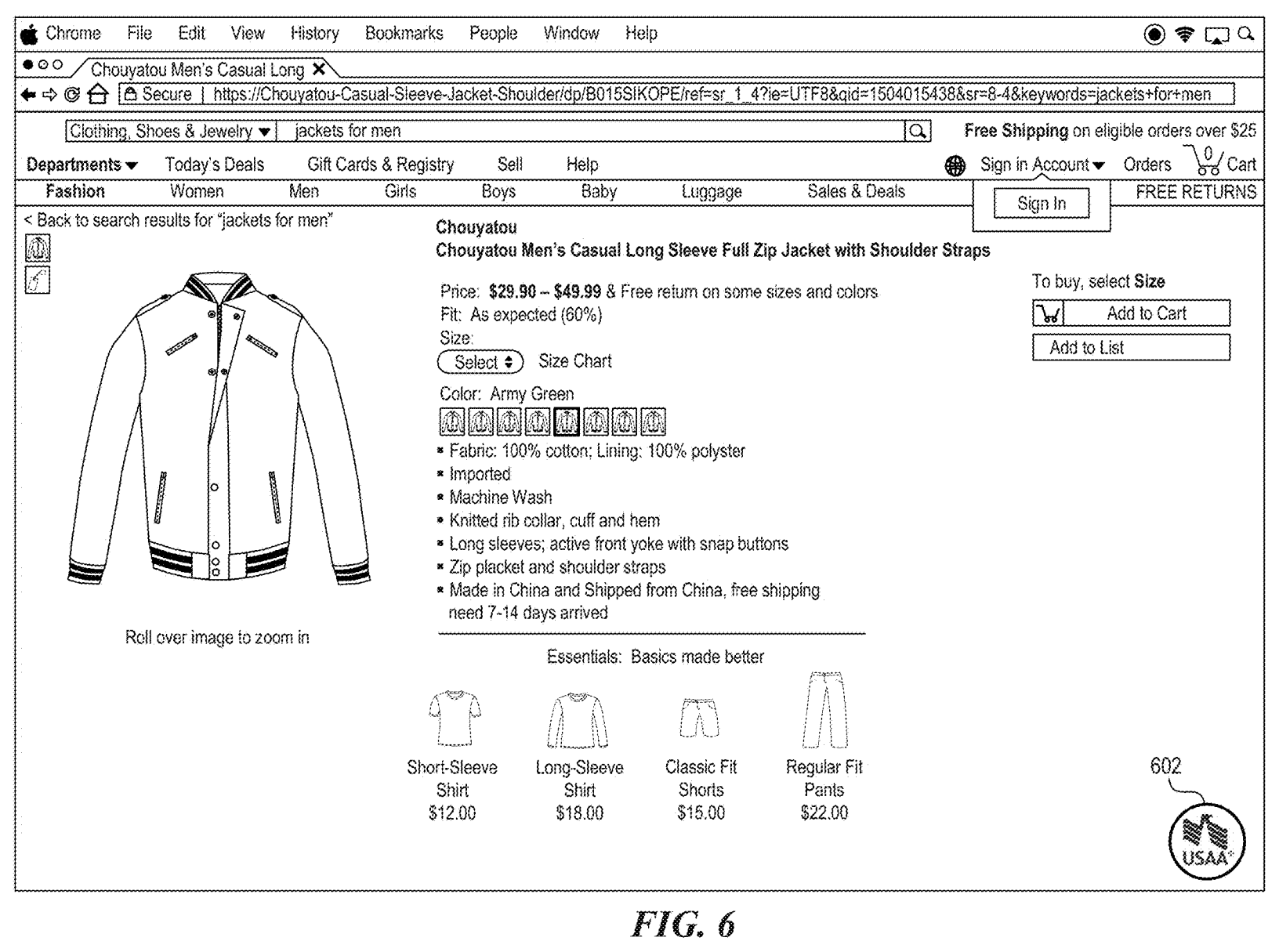

FIGS. 6-11 are examples of user interfaces that can be used in some implementations. FIG. 6 depicts an example of a user interface with an icon 602 that can appear when a retailer or service provider website such as Amazon is being accessed.

Figure 7:
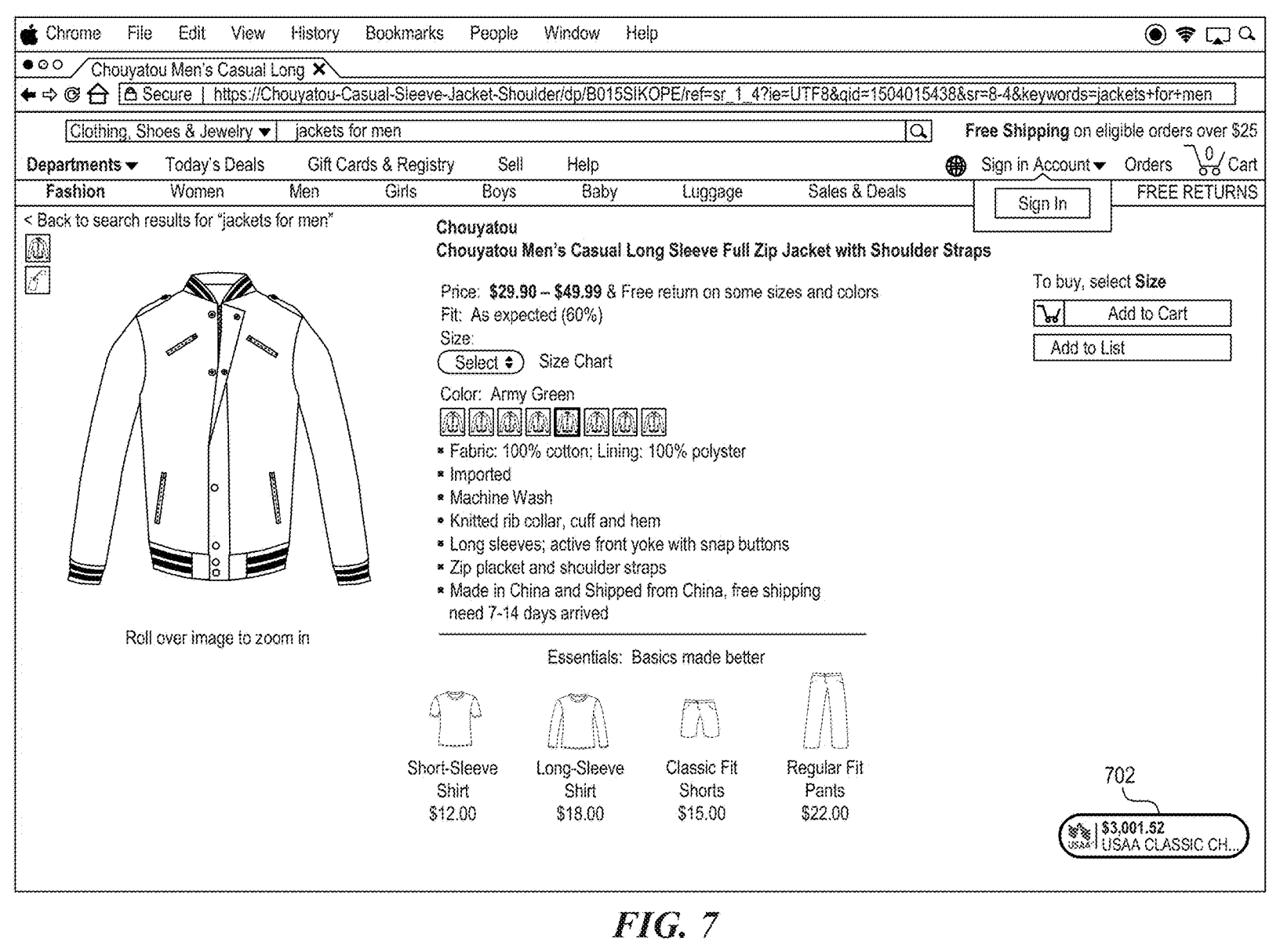

FIG. 7 depicts an example of a user interface with an icon 702 that can appear when icon 602 is selected. Icon 702 can display the balance of a payment instrument typically used by the user at the website.

Figure 8:
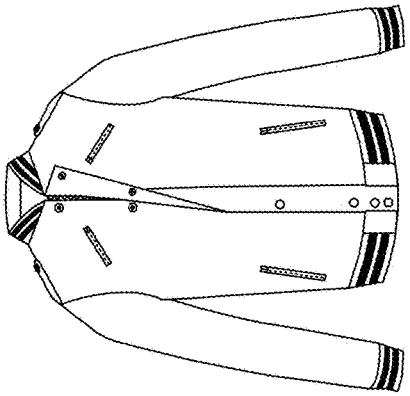

FIG. 8 depicts an example of a user interface with an icon 802 that can appear when a menu item requesting a listing of all payment instruments is selected. In some embodiments, the menu item can appear when icon 602 or 702 is selected.

Figure 9:
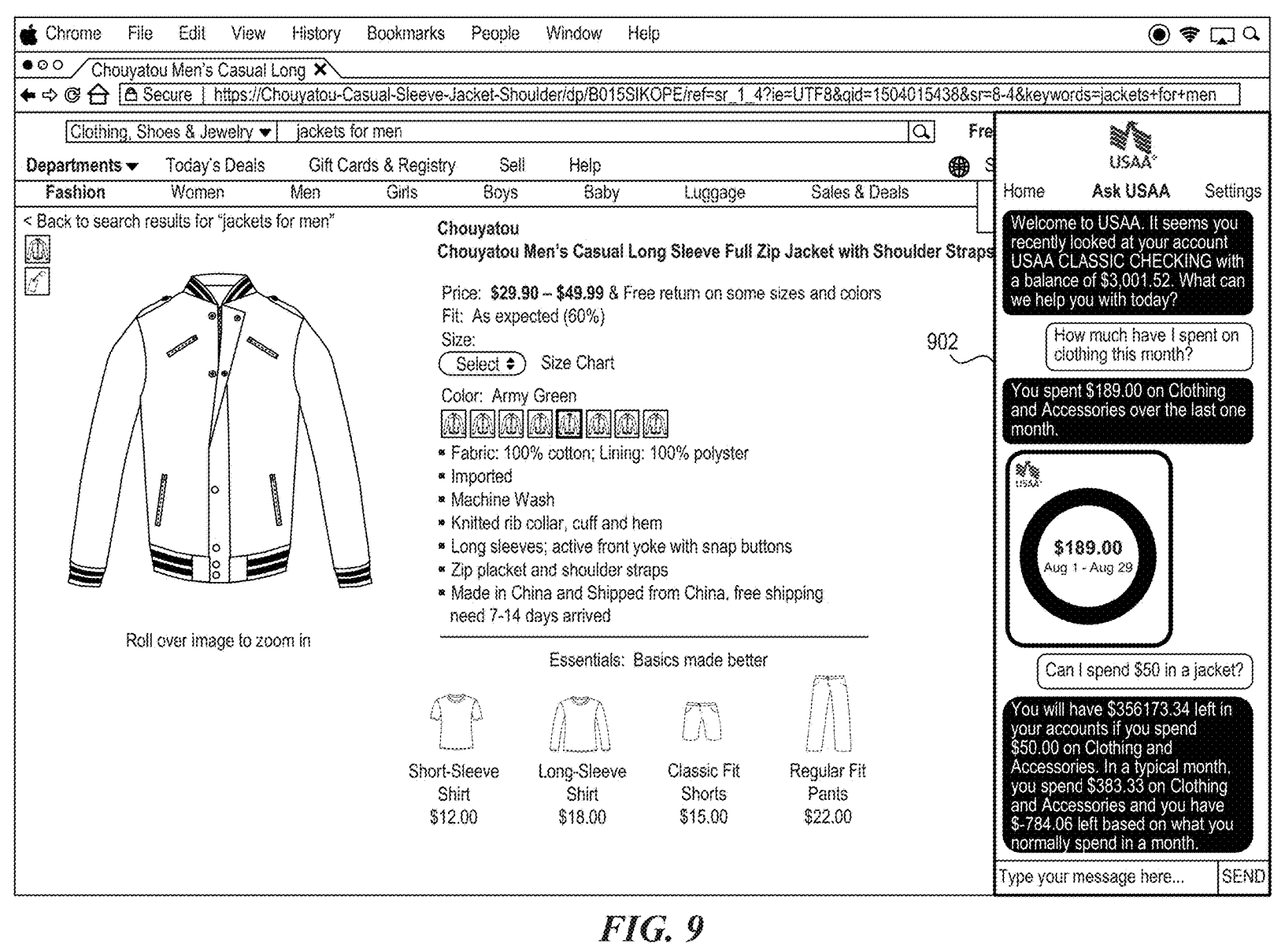

FIG. 9 depicts an example of a user interface with an interactive window 902. Interactive window 902 can appear when icon 602 or 702 is selected, when a menu item associated with icon 602 or 702 is selected, or when the system recognizes the retailer or service provider website. The user can ask questions and receive personalized answers.

Figure 10:
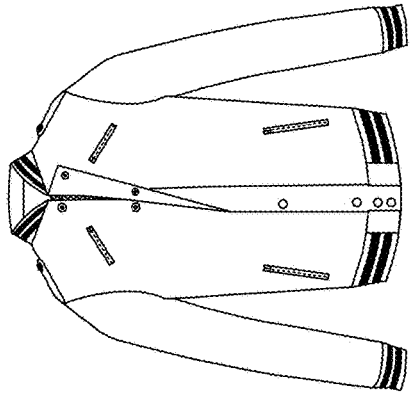

FIG. 10 depicts an example of a user interface with an interactive window 1002 listing payment instruments and other accounts (e.g., checking, savings) associated with a user.

Figure 11:
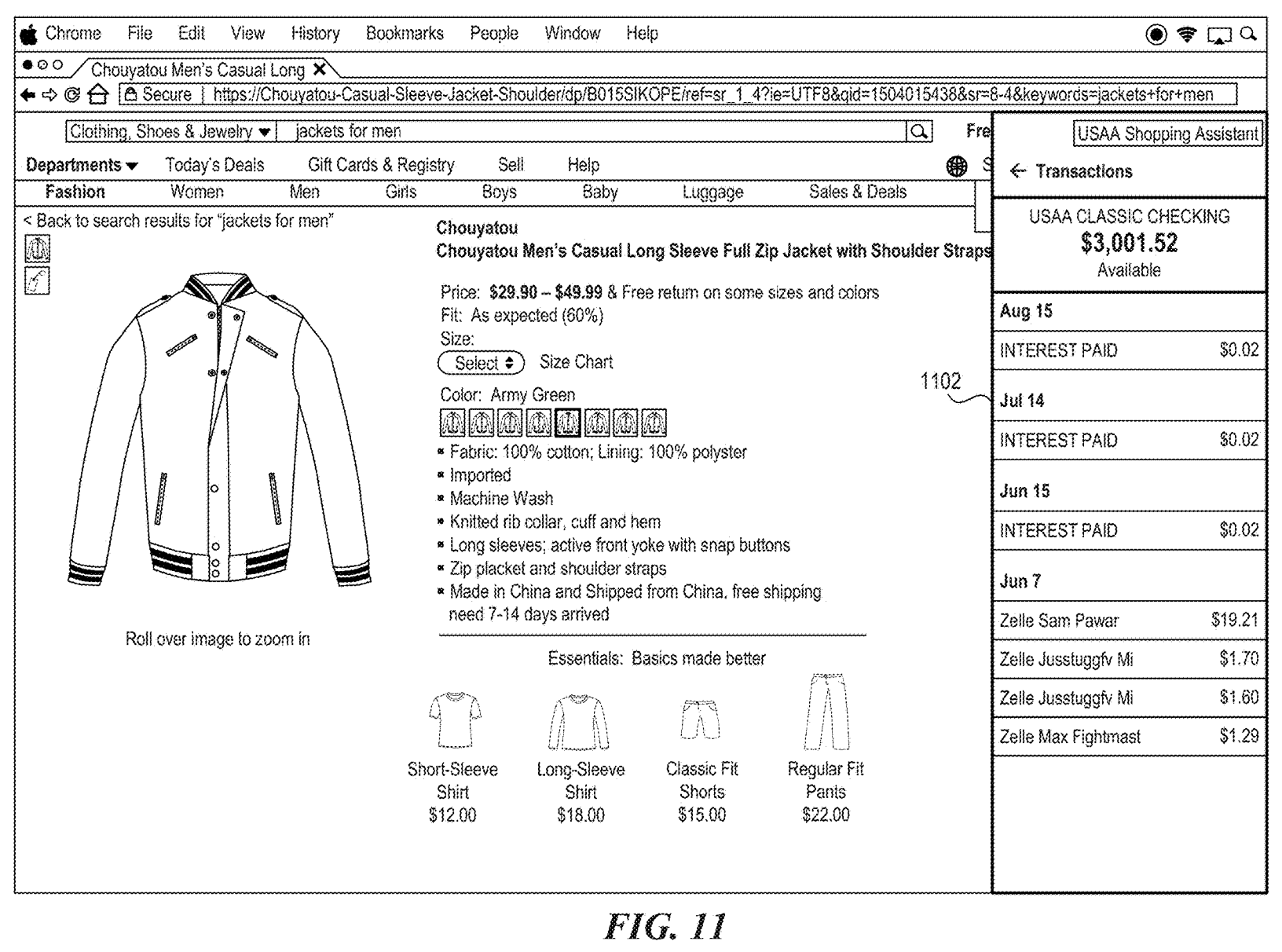

FIG. 11 depicts an example of a user interface with an interactive window 1102 showing specific information regarding an account associated with a user.

Figure 12:
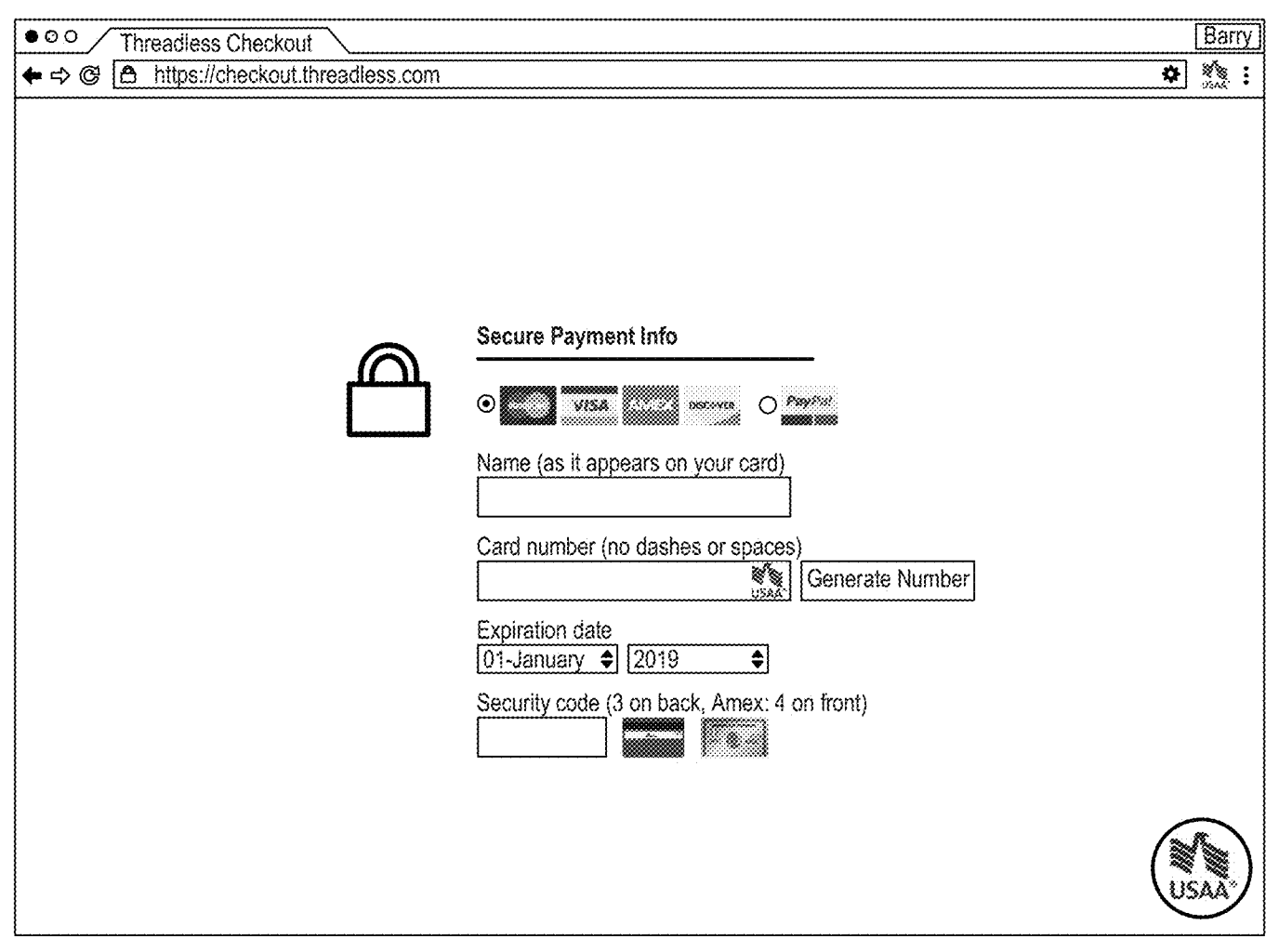

FIG. 12 depicts an example of a user interface where the browser extension includes a selectable button near the card input field for the user to generate a ghost card number ("generate number" button).

Figure 13:

FIG. 13 depicts an example of a user interface that shows a window allowing a user to select features of the ghost card (e.g., recurring vs. single use, maximum amount of funds or transactions, expiration) after the user selects the "generate number" button in FIG. 12.

Figure 14:

FIG. 14 depicts an example of a user interface that shows completed payment information fields after the browser extension automatically inputs the created ghost card number and associated information.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; consequently, the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples. Alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computing system for creating a ghost card for electronic purchases, the computing system comprising:
. . .
place, via the web browser extension, an icon that, when selected by the user, displays the list of selectable payment Instruments;
receive an indication of a payment instrument from the list of selectable payment instruments, that was selected by the user;
receive, from the user, ghost card parameters that include a credit limit and an expiration date, wherein the credit limit and an expiration date are bounded by a credit limit and expiration date of the selected payment instrument;
create an electronic ghost card linked to the selected payment instrument; and
automatically enter, in the payment webpage, information associated with the electronic ghost card, wherein the automatically entered Information associated with the electronic ghost card Is submitted as a transaction request for purchase of the Items In the virtual cart.

2. The system of claim 1, wherein the instructions, when executed by the one or more processors, further cause the computing system to:
identify that the user is accessing the payment webpage a second time; and
automatically enter the information associated with the ghost card when the user accesses the payment webpage.

3. The system of claim 1, wherein the ghost card is a one-time use payment card.

4. The system of claim 1, wherein the instructions, when executed by the one or more processors, further cause the computing system to enable an interactive window that includes personalized information that includes at least one of an account balance or budget information.

5. The system of claim 1, wherein the instructions, when executed by the one or more processors, further cause the computing system to:
enable an interactive window that includes personalized information;
receive, via the interactive window, a question related to items in the shopping cart and a budget of the user; and
cause answers to be displayed.

6. The system of claim 1, wherein the instructions, when executed by the one or more processors, further cause the computing system to:
enable an interactive window that includes personalized information;
wherein displaying the list of selectable Payment instruments is performed in the interactive window.

7. The system of claim 1, wherein the instructions, when executed by the one or more processors, further cause the computing system to:
in response to receiving the transaction request from the retailer using the ghost card, charge the selected payment instrument linked to the ghost card, for the transaction.

8. A computerized method for creating a ghost card for electronic purchases, the method comprising:
. . .
placing, via the web browser extension, an icon that when selected by the user displays the list of selectable payment Instruments;
receiving an indication of a payment instrument, from the list of selectable payment Instruments, that was selected by the user;
receiving, from the user, ghost card parameters that include a credit limit and an expiration date, wherein the credit limit and an expiration date are bounded by a credit limit and expiration date of the selected payment instrument;
creating the electronic ghost card linked to the selected payment instrument;
automatically entering, in the payment webpage, information associated with the electronic ghost card, wherein the automatically entered information associated with the electronic ghost card is submitted as a transaction request for purchase of the items in the virtual cart.

9. The computerized method of claim 8, wherein the method further comprises:
identifying that the user is accessing the payment webpage a second time; and
automatically entering the information associated with the ghost card when the user accesses the payment webpage.

10. The computerized method of claim 8, wherein the ghost card is a one-time use payment card.

11. The computerized method of claim 8, wherein the method further comprises:
receiving, via an interactive window, a question related to at least one of: items in the shopping cart or a budget of the user; and
causing answers to be displayed.

12. The computerized method of claim 8, further comprising:
enabling an interactive window that includes personalized information; and
wherein displaying the list of selectable payment instruments is performed in the interactive window.

13. The computerized method of claim 8, wherein the method further comprises:
receiving the transaction request from the retailer using the ghost card; and
charging the selected payment instrument linked to the ghost card for the transaction.

14. A non-transitory computer-readable storage medium storing instructions that, when executed by a computing system, cause the computing system to perform a process for creating a ghost card for electronic purchases, the process comprising:
. . .
placing, via the web browser extension, an icon that when selected by the user, displays the list of selectable payment Instruments;
receiving an Indication of a payment Instrument, from the list of selectable payment Instruments, that was selected by the user;
receiving, from the user, ghost card parameters that include a credit limit and an expiration date, wherein the credit limit and an expiration date are bounded by a credit limit and expiration date of the selected payment instrument;

creating the electronic ghost card linked to the selected payment instrument;

automatically entering, in the payment webpage, information associated with the electronic ghost card, wherein the automatically entered information associated with the electronic ghost card is submitted as a transaction request for purchase of the items in the virtual cart.

15. The non-transitory computer-readable storage medium of claim 14, wherein the process further comprises:

identifying that the user is accessing another webpage; and automatically entering the information associated with the ghost card when the user accesses the other webpage.

\* \* \* \* \*